United States Patent
Axelrod et al.

(10) Patent No.: US 8,534,232 B2
(45) Date of Patent: Sep. 17, 2013

(54) ANIMAL CHEW WITH VARYING DURABILITY COMPONENTS

(75) Inventors: Glen S. Axelrod, Colts Neck, NJ (US); Ajay Gajria, Maharashtra (IN)

(73) Assignee: T.F.H. Publications, Inc., Neptune City, NJ (US)

( * ) Notice: Subject to any disclaimer, the term of this patent is extended or adjusted under 35 U.S.C. 154(b) by 156 days.

(21) Appl. No.: 13/026,773

(22) Filed: Feb. 14, 2011

(65) Prior Publication Data

US 2012/0204810 A1 Aug. 16, 2012

(51) Int. Cl.
*A01K 29/00* (2006.01)

(52) U.S. Cl.
USPC ........................................ 119/709

(58) Field of Classification Search
USPC ......... 119/702, 707, 709, 710, 711; D30/160
See application file for complete search history.

(56) References Cited

U.S. PATENT DOCUMENTS

| | | | |
|---|---|---|---|
| 5,897,893 A | 4/1999 | Mohilef |
| 5,965,182 A | 10/1999 | Lindgren |
| 6,076,486 A | 6/2000 | Oliano |
| 6,186,096 B1 | 2/2001 | Miller |
| 6,277,420 B1 | 8/2001 | Andersen et al. |
| 6,311,639 B1 | 11/2001 | Stickney |
| 6,634,318 B1 | 10/2003 | Rucker |
| 6,941,895 B2 | 9/2005 | St. Pierre |
| 7,506,614 B1 | 3/2009 | Tsengas |
| 7,647,894 B2 | 1/2010 | Axelrod et al. |
| 2003/0205206 A1 | 11/2003 | Natale et al. |
| 2005/0013899 A1 | 1/2005 | Kostlan et al. |
| 2005/0120973 A1 | 6/2005 | St. Pierre |
| 2006/0134278 A1 | 6/2006 | Miller |
| 2007/0044730 A1 | 3/2007 | Axelrod et al. |
| 2007/0212456 A1 | 9/2007 | Axelrod |
| 2009/0025649 A1 | 1/2009 | Gamble et al. |
| 2009/0078214 A1* | 3/2009 | Mann ............................ 119/709 |
| 2009/0217885 A1 | 9/2009 | Peter et al. |
| 2009/0255482 A1 | 10/2009 | Santarsiero |

OTHER PUBLICATIONS

International Search Report from corresponding PCT Application No. PCT/US12/24841 dated Jun. 15, 2012.

* cited by examiner

*Primary Examiner* — Rob Swiatek
*Assistant Examiner* — Ebony Evans
(74) *Attorney, Agent, or Firm* — Grossman, Tucker, Perreault & Pfleger, PLLC

(57) ABSTRACT

An animal chew for an animal, comprising a body having a first outer shape and comprising a first relatively less durable composition, the shape including an opening extending at least part way through the body; a holder having a second shape and comprising a second material, the second material comprising a relatively more durable polymer, the second shape including a shaft portion complementary in shape to the opening in the body to provide an interference fit. The relatively more durable composition of the holder is characterized as having one or more of a variety of features that characterize the more durable composition with respect to the chewing behavior of an animal.

15 Claims, 4 Drawing Sheets

ANIMAL CHEW WITH VARYING DURABILITY COMPONENTS

FIELD

This invention relates to molded pet chews and, more particularly, to a molded animal chew which includes a relatively more durable long-lasting insert for holding pet treats, the insert capable of receiving a variety of exchangeable and replaceable consumable treats for consumption by an animal.

BACKGROUND

Many animals, particularly dogs, enjoy chewing on things, although preferences may vary as to the hardness of the substances favored. Some dogs may like to chew on very hard materials such as cow bones, wood and nylon, while others may prefer softer chews such as polyurethane or rubber or starch-based edible formulations. Still others may favor freeze dried snacks. Some dogs, due to their age, may not be able to chew on very hard substances. Young dogs may have insufficiently developed teeth, while old dogs may have diseased gums or may have lost some of their teeth. Accordingly, softer and more readily consumable chews may be preferred.

Pet toys such as dog chews may be produced in nearly any shape by melt processing, particularly bone shapes, generally having larger ends and a smaller elongated shaft to allow the dog to easily pick them up. The ends may generally be bulbous and may be in the shape of a condyle. Dogs generally will hold one end of a dog chew between their paws in order to chew the body portion.

Furthermore, chew toys may be used as a vehicle to provide interaction between dogs and people. For example, some people like to play fetch with dogs using sticks, balls, flying disks, etc. Other people like to play "tug-of-war" with their animals, using the condyle to grasp the chew. The interaction between pets and their owners has reportedly been found to be not only beneficial to the pet, as it provides the pet with necessary exercise and companionship, but beneficial to their owners as well, with many reported health related benefits.

The prior art is replete with disclosures directed at forming a variety of chew toys. However, there remains a need to provide chew toys that fulfill other requirements. For example, it may also be useful to provide pet chews that are interesting not only to pets, but to the pet owners as well. Additionally, it may also be useful to provide pet chews that enhance the feel of the chew to the pet or owner. Accordingly, a pet toy of novel construction may be directed to sparking the interest of, not only the pet, but children, teenage or adult owners, which may increase the time period that owners engage with their animals.

Further, it may be preferred that such chew toys comprise more than one material such that a variety of chewing experiences may be provided for the pet. Towards that end, if different materials having different physical properties, such as hardness or durability, can be combined into a single chew, one of the materials may be used as a holder for the other.

Edible dog chews have been marketed which have a comparatively short shelf life and therefore must be replaced at frequent intervals. With a chew toy of two different materials, it is possible that when the more edible material has been consumed, that the remaining portion will be thrown away. What is needed is a combination of durable chew holder and replaceable chews in a variety of shapes that may be connected to the holder and provide a means for holding the chew either by the animal or by the animal owner.

SUMMARY

An animal chew for an animal, comprising a body having a first outer shape and comprising a first relatively less durable composition, the shape including an opening extending at least part way through the body; a holder having a second shape and comprising a second material, the second material comprising a relatively more durable polymer, the second shape including a shaft portion complementary in shape to said opening in said body to provide an interference fit. The relatively more durable composition of said holder is characterized as having one or more of the following features as compared to said relatively less durable body portion: (1) higher Shore Hardness; (2) higher Tm; (3) higher molecular weight average; (4) higher density; (5) lower relative moisture content; (6) relatively thicker cross-section; (7) higher flexural and/or tensile modulus; (8) higher tensile strength; (9) lower elongation at yield; or (10) higher notched izod impact strength.

BRIEF DESCRIPTION OF THE DRAWINGS

The features, operation and advantages of the invention may be better understood from the following detailed description of the preferred embodiments taken in conjunction with the attached drawings, in which.

DETAILED DESCRIPTION

Figure 1:
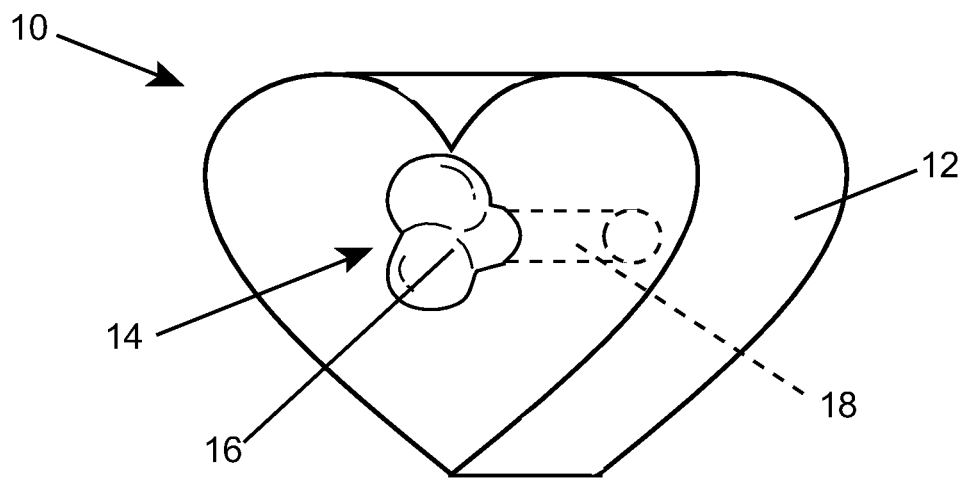
FIG. 1 is a perspective view of an exemplary animal chew according to the present disclosure.

Still other objects and advantages of the present invention will become readily apparent to those skilled in the art from the following detailed description, wherein it is shown and described preferred embodiments of the invention. As will be realized the invention is capable of other and different embodiments, and its several details are capable of modification in various respects, without departing from the invention. Accordingly, the description is to be regarded as illustrative in nature and not as restrictive.

For elements common to the various embodiments of the present disclosure, the numerical reference character between the embodiments is held constant, but distinguished by the alphanumeric character to the existing reference character. In other words, for example, an element referenced at 10 in the first embodiment is correspondingly referenced at 10A, 10B, and so forth in subsequent embodiments. Thus, where an embodiment uses a reference character to refer to an element, the reference character applies equally, as distinguished by alphanumeric character, to the other embodiments where the element is common.

The present disclosure is directed at a chew toy for an animal or pet and may comprise two, or more, molded shapes of different melt-processible materials, a first outer shape (heart, lobed, etc.) of a relatively less durable and more readily consumable composition (e.g. starch-based, flavored, nutrient-containing, etc.) having an aperture at least part-way through, and a second shape of a second relatively more durable composition (nylon, polyurethane, etc.) that is not capable of being as being readily consumed by the animal.

Reference to a more durable composition may therefore be understood as a composition that has one or more of the following features as compared to the relatively less durable composition: (1) higher Shore Hardness; (2) higher Tm or higher levels of crystallinity; (3) higher molecular weight average such as a relatively high value of the weight average MW (Mw) or number average MW (Mn); (4) higher density; (5) lower relative moisture content; (6) relatively thicker cross-section; (7) higher flexural and/or tensile modulus; (8) higher tensile strength; (9) lower elongation at yield; (10) high notched izod impact strength. Accordingly, one or more of the aforementioned features may be a characteristic of the more durable composition herein.

Expanding on the above, it may be appreciated that the relatively less durable composition may amount to a composition that is more readily consumed by the animal. For example, with respect to the parameter of hardness, the animal may naturally tend to chew and consume that composition that is has lower relative hardness. In addition, the animal may naturally tend to chew on that composition that has lower relatively flexural or tensile modulus. In addition, as between two similar resins, the animal is more likely to chew on that composition that indicates the higher relative moisture content.

The second shape is preferably formed to fit with an interference fit into the opening in the first shape, with one end, for instance having a knuckle shape or condyle extending outward for grasping by the animal or owner. With such a configuration, the second shape may act as a "dispenser" or "holder" for the relatively less durable composition and may be inserted into a new "first shape" to extend the enjoyment by the pet, and provide reuse of the more durable material. The outer surface of the second cylindrical shape may include a groove or projection and the inner surface of the aperture may include a complementary-shaped groove ("L-shaped") or projection for locking the two shapes together. The aperture may be a through hole and the shapes may preferably be injection molded or extruded.

FIG. 1 is a perspective view of an exemplary animal chew 10 according to the present disclosure having a body 12 of a first relatively less durable composition and including a holder 14 of a different shape and of a second relatively more durable composition, the holder insertable into the body to act as a holder for chew. The holder is useful for providing a means for the animal or his owner to control and stabilize the chew (for chewing, tug-of-war, etc.) and as a device upon which new and/or different replacement bodies may be mounted, once the original body has been consumed.

Figure 2:
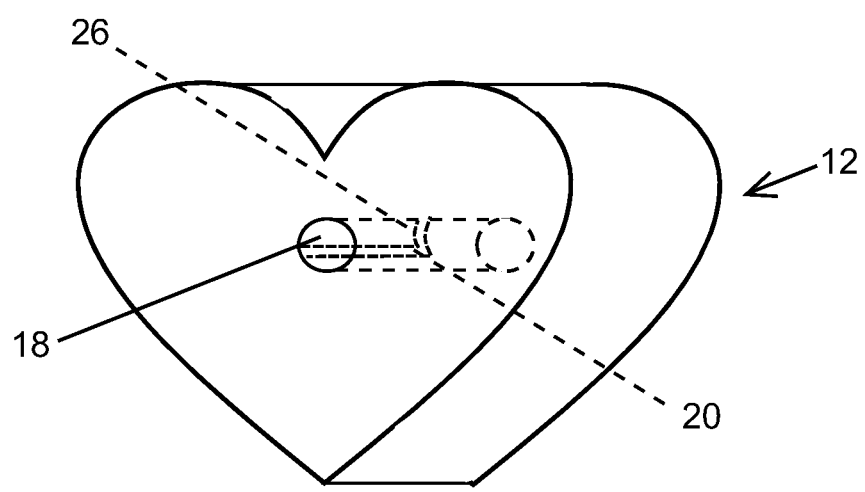
FIG. 2 is a perspective view of the animal chew of FIG. 1 with the holder removed.

FIG. 2 is a perspective view of the animal chew of FIG. 1 with the holder removed to illustrate how the holder portion 14 and body portion 12 may be engaged. Reference numeral 18 indicates an opening which extends at least part way through the body portion 12 into which a shaft portion of the holder 14 (see FIG. 3) may be inserted. The opening may extend completely through the body portion 12 and be of any shape that is complementary to the shaft portion of the holder 14 (for instance round, elliptical, polygonal). Preferably, the shaft and hole will be round to allow locking of the body on to the holder, as will be explained below.

Figure 3:
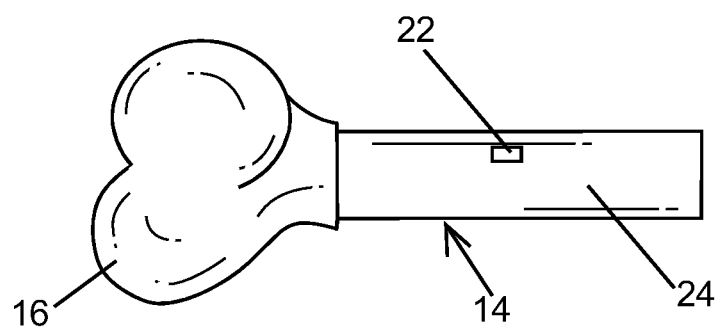
FIG. 3 is a side view of the holder of the animal chew of FIG. 1.

FIG. 3 is a side view of the holder of the animal chew of FIG. 1, illustrating a shaft 24 and a bulbous end 16, which may allow for relatively easy grasping of the chew and holding such during interfacing with an animal. As noted, the shaft 24 may be round or any other suitable shape (elliptical and/or polygonal).

Figure 4:
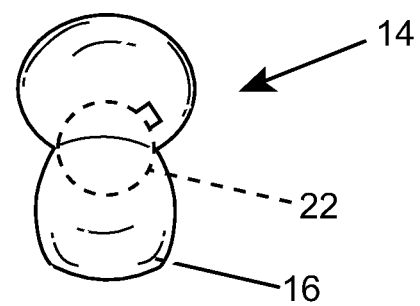
FIG. 4 is an end view of the holder of the animal chew of FIG. 3.

Holder 14 and body 12 may include complementary locking means such that the animal chew may not be readily separated during normal use but that may allow new and/or different body shapes to be assembled for continued enjoyment by the animal. As illustrated in FIGS. 3 and 4, the holder shaft 24 may include a projection 22 extending from its' outer surface, the projection of a size and shape that it can mechanically engage a groove 20 that extends along the inside of the opening 18. See FIG. 2. The groove may be tapered to narrow as it extends inward to frictionally engage the projection, or more preferably, the end of the groove may form an "L-shape" leg 26 that extends part way around the inner periphery of the opening such that the holder 14 may be grasped by the end 16 and turned to lock the body 12 onto the holder 14. It is contemplated that the projection may extend from the inner surface of the opening and the complementary "L-shaped" groove may reside in the surface of the holder shaft.

It is further contemplated that other means of securely engaging the body and holder may be used, such as having complementary tapered shafts and openings, having more than one projection and groove, having a shaft with a helical thread formed thereon and an opening with a complementary groove for engagement, or a smooth opening of a softer material than the shaft such that when inserted and turned, the harder thread will cut a groove into the wall of the opening.

FIG. 4 is an end view of the holder of the animal chew of FIG. 3 illustrating one exemplary shape of a bulbous end that may be relatively conducive to grasping and holding or turning. By "bulbous shape" it is meant that the shape provides an end portion that is relatively large compared to the shaft and preferably includes some sort of protrusions (knuckles, knobs, etc.).

Figure 5:
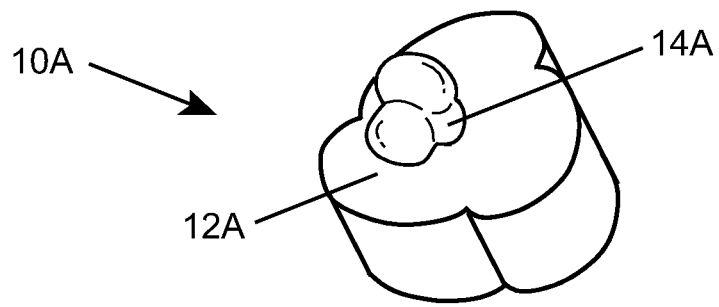
FIGS. 5-7 are perspective views of animal chews of different exemplary shapes according to the present disclosure.
Figure 6:
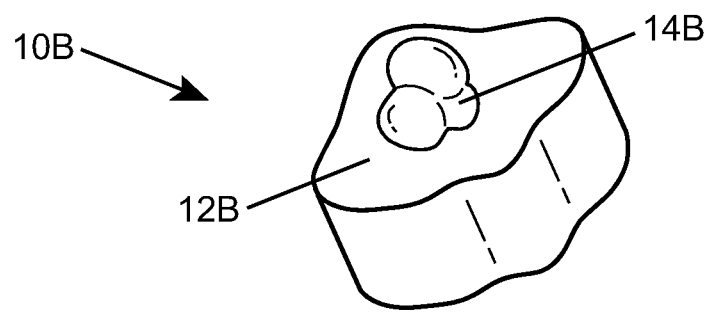
Figure 7:
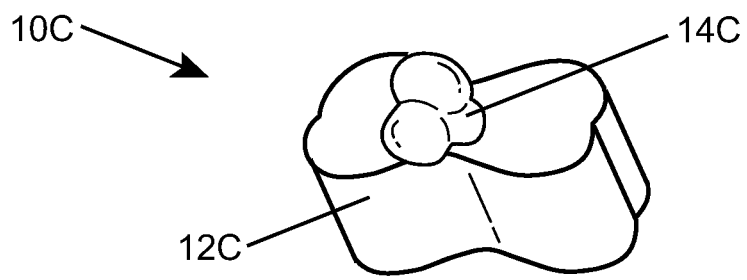

FIGS. 5-7 are perspective views of animal chews of different exemplary shapes which may be assembled onto a holder for replacement or exchange to continue or change the chewing experience of the animal. FIG. 5 depicts a three-lobed shape, FIG. 6 a pork chop or other cut of meat and FIG. 7, a dog bone shape.

Figure 8:
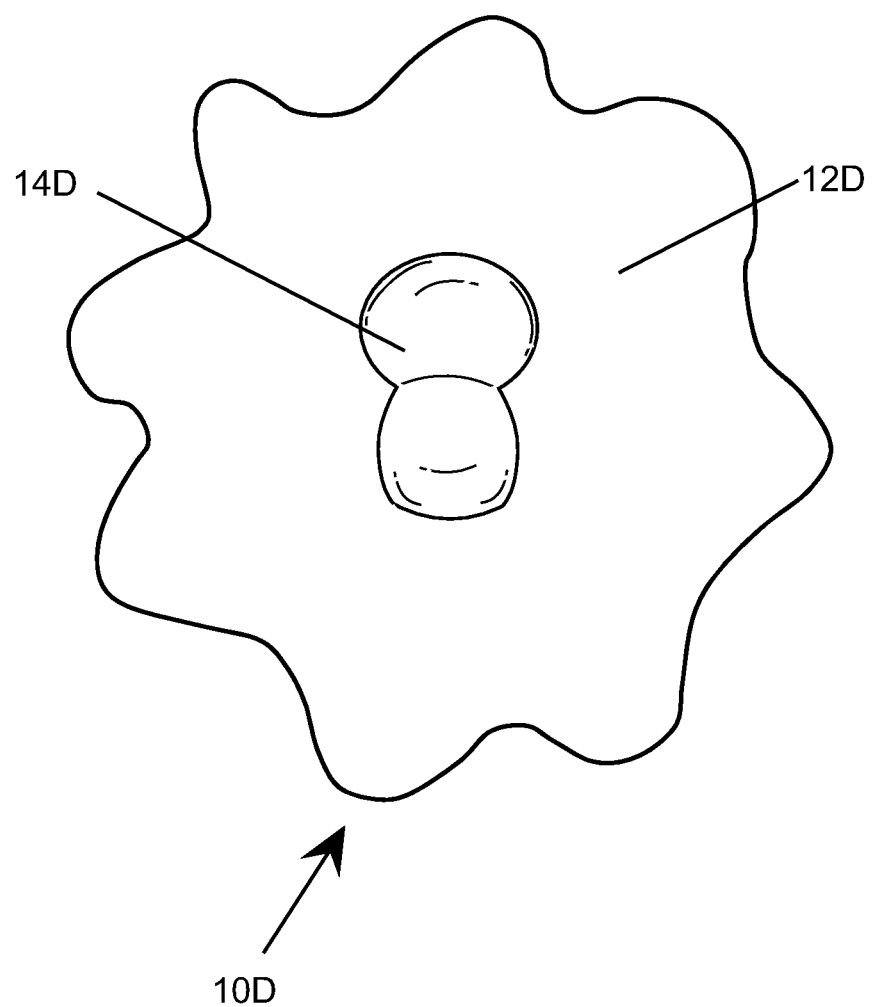
FIG. 8 is a front view of still another shape of animal chew according to the present disclosure.

FIG. 8 is a front view of still another shape of animal chew 10D according to the present disclosure, including a body 12D and a holder 14D.

The relatively more durable holder 14 is preferably formed of a relatively hard thermoplastic polymer such as a polyamide or a polyurethane of relatively high hardness (Shore D durometer of 50 or greater). The Shore D may range from 20-80. Other polymer may include rubber materials, thermoplastic elastomers, nylon copolymers, styrene-butadiene copolymers, polyether-amide copolymers, silicone, polycarbonate, polycarbonate copolymers, thermosetting polymers and natural rubber. It should be appreciated that the holder may include color or light transmitting capacity of the material as well as attractants, flavorants and fillers.

The body 12 of the animal chew is preferably a relatively less durable and relatively more readily consumable composition than the holder 14 and may preferably comprise an edible resin composition.

Edible resin compositions may include any starch or carbohydrate of natural or vegetable origin. The starch may include amylose and/or amylopectin and may be extracted from plants, including but not limited to potatoes, rice, tapioca, corn and cereals such as rye, wheat, and oats. The starch may also be extracted from fruits, nuts and rhizomes, or arrowroot, guar gum, locust bean, arracacha, buckwheat, banana, barley, cassaya, konjac, kudzu, oca, sago, sorghum, sweet potato, taro, yams, fava beans, lentils and peas. The starch may be present in the edible resin composition between about 30-99% including all increments and values there between such as levels above about 50%, 85%, etc.

The starch employed herein may be raw starch, which may be understood as starch that has not seen any prior thermal molding history, such as extrusion or other type of melt processing step where the resin is shaped in the presence of heat. The raw starch itself may also be native, which may be understood as unmodified starch recovered in the original form by extraction and not physically or chemically modified. The raw starch may also be in powder form of varying particle size, which may be in the range of about 1-2000 μm, including all ranges and increments therein. Raw starch may be understood as milled and/or pre-sifted starch. It should be understood that the raw starch may also have varying degrees of moisture present. In one embodiment moisture may be present in the raw starch between 1-60%, including all increments and values there between such as 40%, 20%, 10%, etc.

The edible resin compositions herein may be sourced from Manildra Group USA, under the following tradenames: "GEMSTAR 100" which is a refined food grade wheat starch; "GEMSTAR 100+" which is a refined food grade wheat starch; "GEM OF THE WEST VITAL WHEAT GLUTEN" which is a powder product by low temperature drying of gluten extracted from wheat flour; "ORGANIC GEM OF THE WEST VITAL WHEAT GLUTEN" which is a powder product by low temperature drying of gluten extracted from organic wheat flour; "ORGANIC GEMSTAR 100" which is a wheat starch extracted from organic what flour; and/or "ORGANIC GEMGEL 100" which is a pregelatinized organic wheat starch In addition, the resin composition may be sourced from ADM under the trade name "EDIGEL 100" which is a wheat resin composition; "AYTEX P" which is a unmodified food grade wheat starch.

Other edible resin materials may be contemplated that may be derived from animal sources such as casein, denatured or hydrolyzed casein, collagen, denatured or hydrolyzed collagen, rawhide, gelatin, other animal protein products, such as animal meal. The resin material may also be derived from plant matter such as gluten, vegetable matter, nuts, such as nut flour, paste or bits, fruit matter, etc. It should also be appreciated that the various edible resin materials, (i.e. starch, animal derived sources, and plant derived sources) may be blended with other edible resin compositions, as well as with thermoplastic materials, and/or thermoset materials.

For example, glutens may be incorporated into the edible resin composition. Gluten may be understood as water-insoluble protein complex extracted from cereal grains such as maize or corn and wheat. The gluten may be present individually or cumulatively between about 0.1-50% by weight of the resin composition and all increments and values there between including 0.1-5.0%, 15%, 25%, etc.

In addition various additives may be incorporated into the edible resin compositions. For example, the edible resin compositions may include cellulose. The cellulose may be, for example, a long-chain polymer of polysaccharide carbohydrate. The cellulose may also be derived or extracted from plants. The cellulose may be incorporated into the resin composition between about 1-15% by weight of the resin composition and any increment or value there between including 4%, 10%, 11%, etc.

Emulsifiers or surfactants may also be incorporated into the edible resin compositions. The emulsifier may be present between about 1-10% by weight of the resin composition and all increments or values there between including 3%, 4%, etc. The emulsifier may include, for example, lecithin, which may be extracted or derived from, for example, egg yolk or soy beans.

The edible resin compositions may also include a plasticizer. The plasticizer may include for example, glycerin. The plasticizer may be incorporated between about 15-30%, including all increments and values there between such as levels greater than 15%, 21%, 27% etc.

A humectant may also be incorporated into the edible resin composition. The humectant may include, for example, oat fiber. The humectant may be incorporated between about 0.1-5% by weight of the resin composition including all intervals and values there between, including 1%, 25%, etc. A humectant may be understood to be any additive that may absorb water in the material.

The edible resin composition may also include water. The water may be introduced into the composition between about 1-40% by weight of the edible resin compositions and any increment or value there between, including 4%, 20-40%, 10-20%, etc. After the product has been formed, the water may be present between 1-20% by weight of the resin composition including all increments or values there between, such as, below 20%, 4%, 5-10%, etc.

The edible composition may generally include a nutraceutical. The nutraceutical may be fermented soya. Fermented soya nutraceuticals are available from Bio Food, Ltd., Pine Brook, N.J. and sold under the general trademark Soynatto®. The fermented soya is present between about 1-40% by weight of the resin composition, including all increments and values there between, including 10%, 20%, etc.

The edible composition may also include enzymes and/or co-enzymes which are similarly available through Bio Foods, Ltd., Pine Brook, N.J. and sold under the trademark of BT-CoQ10®. This reportedly is a biologically transformed (fermented) cell mitochondrial coenzyme and contains Coenzyme Q10, antioxidants, phytonutrients and cofactor mineral nutrients and other cell constituents. The enzymes and/or co-enzymes may be present between 0.1-10% by weight of the resin composition, including all increments and values there between such as 1%, 5%, etc.

In addition, herbal extracts, vitamins, minerals, colorants, yeast products, soy products, attractants, etc., may also be incorporated into edible composition to provide nutritional value. Yeast products, for example, may include nutritional yeast or brewers yeast such as *saccharomyces cerevisiae*, dairy yeast such as *kluyveromyce marxianus* or wine yeast such as *saccharomyces fermentati*. It should be appreciated that, the edible composition may be provided with a colorant, attractant, flavorant, etc.

Either of the holder and/or body may be transparent or translucent or include luminescent or fluorescent materials.

While the shapes shown herein are particularly conducive to injection or compression molding, it is contemplated that extrusion processes may also be used to form one or more of the body and the holder.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. An animal chew for an animal, comprising:
   a body having a first shape and comprising a first relatively less durable edible composition, the body further comprising an opening extending at least part way there through said opening comprising one or more L-shaped grooves;

a holder having a second shape and comprising a second material, the second material comprising a relatively more durable inedible polymer, the second shape including a shaft portion complementary in shape to said opening in said body to provide an interference fit, said shaft portion comprising one or more projections;

wherein said relatively more durable composition of said holder has one or more of the following features as compared to said relatively less durable body: (1) higher Shore Hardness; (2) higher Tm; (3) higher molecular weight average; (4) higher density; (5) lower relative moisture content; (6) relatively thicker cross-section; (7) higher flexural and/or tensile modulus; (8) higher tensile strength; (9) lower elongation at yield; or (10) higher notched izod impact strength;

wherein said shaft portion is engaged in said opening in said body such that said one or more projections of said shaft portion mechanically engage said one or more L-shaped grooves of said to provide a lock.

2. The animal chew of claim 1 wherein said shaft further comprises one or more grooves and said opening in said body further comprises one or more projections such that upon engaging said shaft in said opening the one or more projections of said body mechanically engage said one or more grooves of said shaft.

3. The animal chew of claim 2 wherein at least one of said one or more grooves of said shaft is "L-shaped" to provide a lock.

4. The animal chew of claim 1 wherein said body is in the shape of a multi-lobed object.

5. The animal chew of claim 1 wherein said holder includes a bulbous end.

6. The animal chew of claim 1 wherein said holder includes an end having a width and said shaft has a width and said end is greater in width than said shaft.

7. The animal chew of claim 1 wherein said relatively less durable composition includes starch.

8. The animal chew of claim 1 wherein said durable polymer is one of nylon, polyurethane, rubber material, thermoplastic elastomers, nylon copolymers, styrene-butadiene copolymers, polyether-amide copolymers, silicone, polycarbonate, polycarbonate copolymers, thermosetting polymers and natural rubber.

9. The animal chew of claim 1 wherein said body is in the shape of a heart, pork chop or dog bone.

10. An animal chew for an animal, comprising:

a body having a first shape and comprising a first relatively less durable edible composition, the body further comprising an opening extending at least part way there through said opening comprising one or more projections;

a holder having a second shape and comprising a second material, the second material comprising a relatively more durable inedible polymer, the second shape including a shaft portion complementary in shape to said opening in said body to provide an interference fit, said shaft portion comprising one or more L-shaped grooves;

wherein said relatively more durable composition of said holder has one or more of the following features as compared to said relatively less durable body: (1) higher Shore Hardness; (2) higher Tm; (3) higher molecular weight average; (4) higher density; (5) lower relative moisture content; (6) relatively thicker cross-section; (7) higher flexural and/or tensile modulus; (8) higher tensile strength; (9) lower elongation at yield; or (10) higher notched izod impact strength;

wherein said shaft portion is engaged in said opening in said body such that said one or more projections of said body mechanically engage said one or more L-shaped grooves of said shaft portion to provide a lock.

11. The animal chew of claim 10 wherein said body is in the shape of a multi-lobed object.

12. The animal chew of claim 10 wherein said holder includes a bulbous end.

13. The animal chew of claim 10 wherein said holder includes an end having a width and said shaft has a width and said end is greater in width than said shaft.

14. The animal chew of claim 10 wherein said relatively less durable composition includes starch.

15. The animal chew of claim 10 wherein said body is in the shape of a heart, pork chop or dog bone.

* * * * *